Feb. 1, 1966          A. P. KRUEGER          3,232,242
SIDE TRANSFER FOR TRAILERS
Filed Dec. 14, 1961
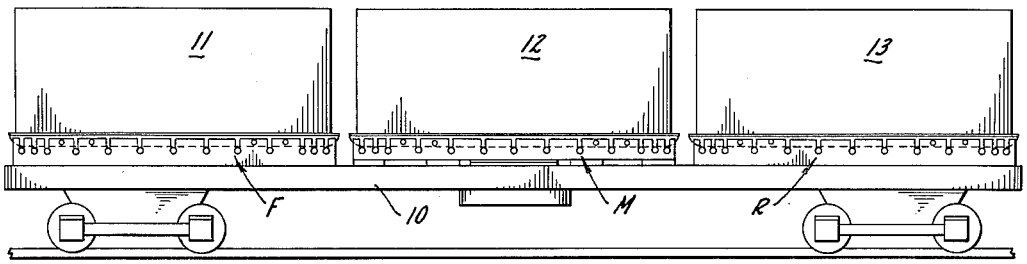
*fig.1.*
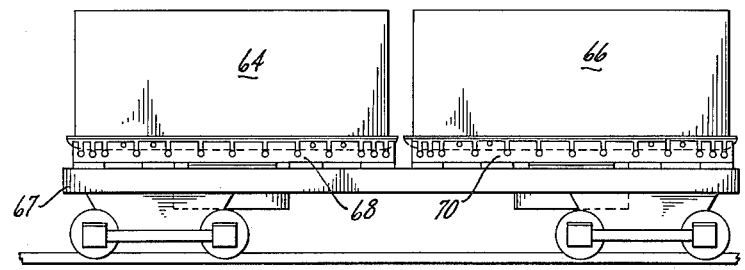
*fig.2.*
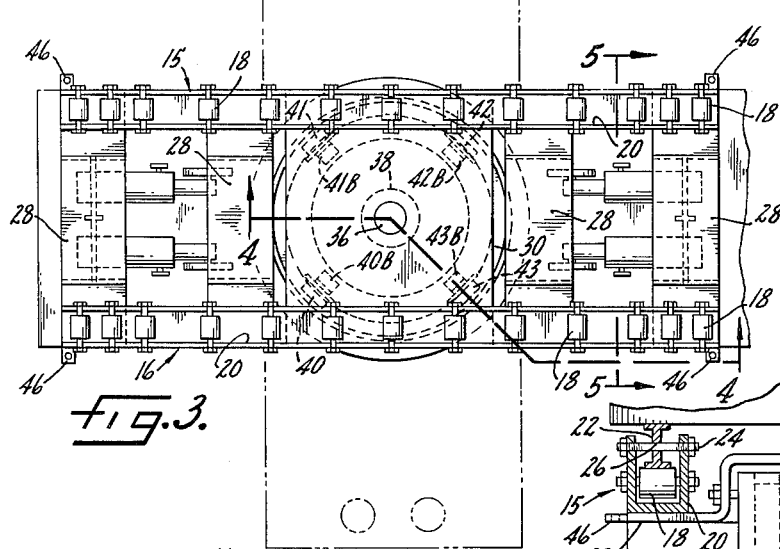
*fig.3.*
*fig.5.*
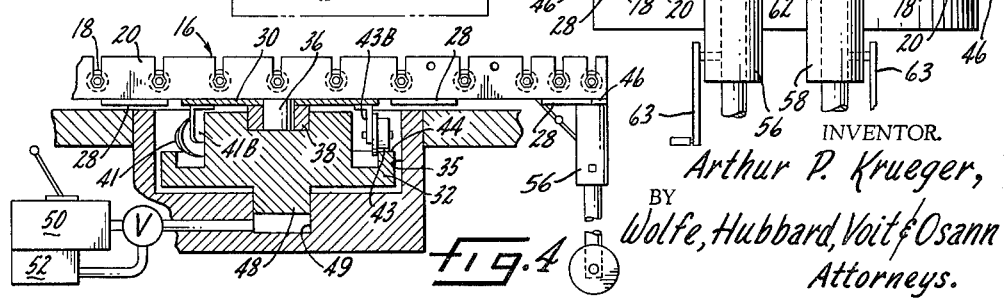
*fig.4.*
INVENTOR.
Arthur P. Krueger,
BY Wolfe, Hubbard, Voit & Osann
Attorneys.

_____

3,232,242
SIDE TRANSFER FOR TRAILERS
Arthur P. Krueger, Rte. 1, Box 339, Bristol, Wis.
Filed Dec. 14, 1961, Ser. No. 159,370
1 Claim. (Cl. 105—366)

The present invention relates to loading apparatus and more particularly to apparatus especially suited for loading and unloading trailer bodies onto railroad flat cars.

It is the principal object of the present invention to provide an apparatus for loading trailer bodies onto railroad flat cars from the side of such cars quickly and efficiently. Another object is to provide such a side loader apparatus which is capable of supporting and transferring heavily loaded trailer bodies but which is simple, compact, and relatively easy to install and maintain.

Another object is to provide a side loader apparatus which is supported by the railroad flat car and is especially suited for entirely manual operation, so that the flat car can be loaded and unloaded anywhere that a tractor can drive up to the side of the flat car to take off the trailer body, and the operation can be handled by a driver and helper without ramps, cranes or power assists other than that provided by or on the tractor. A related object is to provide a side loader apparatus carried by a railroad flat car, and serving also as means for supporting a trailer body for long distance transport.

Other objects and advantages of the invention will become apparent upon reading the attached detailed description and upon reference to the drawings, in which:

FIGURE 1 is a view in side elevation of a railroad flat car with means for supporting three trailer bodies for long distance transport, the middle trailer body being carried by side loader apparatus constructed in accordance with the invention.

FIG. 2 is a view in side elevation of a railroad flat car with means for supporting two trailer bodies for long distance transport, with both of such bodies being carried by side loader apparatus constructed in accordance with the invention;

FIG. 3 is a plan view of the side loader apparatus shown in either FIGURES 1 or 2, illustrating the swivelling operation of such apparatus;

FIG. 4 is a vertical sectional view taken in the planes defined by the lines 4—4 in FIG. 3, illustrating the elevating means and swivel support for the loader apparatus shown in FIG. 3; and FIG. 5 is a transverse vertical sectional view taken in the plane of lines 5—5 in FIG. 3.

While the invention is susceptible of various modifications and alternative constructions, certain illustrative embodiments have been shown in the drawings and will be described below in detail. It should be understood, however, that there is no intention to limit the invention to the specific form disclosed, but on the contrary, the intention is to cover all modifications, methods, alternative constructions, and equivalents falling within the spirit and scope of the invention as expressed in the appended claim.

Referring to the drawings, a railroad flat car 10 is shown in FIGURE 1 supporting an arrangement of rails divided into sections F, M, R providing ways for slidably receiving a plurality, herein shown as three, trailer bodies 11, 12, 13 on the bed of the flat car. The way structure carried on the flat car is similar to that disclosed in my issued Patent No. 2,981,210 relating to a system of transport for trailers, and the details of the system are set forth in such patent. The present invention relates to means for loading trailer bodies onto railroad flat cars, and is more particularly directed to means for loading trailer bodies from the side of the flat cars and, hence, is herein sometimes called a side loader apparatus.

As set forth in more complete detail in my patent, to which reference may be made for such details, the system for long distance transport entails removal of the trailer bodies from their wheel and axle assembly and sliding the trailer bodies by means of rails carried under the bodies onto cargo carriers, such as railroad flat cars. The cargo carriers are provided with parallel ways spaced to slidably receive the trailer body rails and the trailer bodies are secured thereon by interlocking means, shown in FIG. 5 of the present drawings, which restrains and ties down the trailer bodies against vertical and sidewise movement on the way structure.

While the railroad flat car way structure disclosed in the patent extends for the full length of the flat car, as shown herein in FIGURES 1 and 2, the way structure is formed in sections F, M, R. Flat cars with ways extending the full length of the car on the bed thereof are limited to loading from either end unless the trailer bodies are lifted onto the car ways, as by means of a crane. According to the present invention, certain sections, herein shown as the middle section M in FIGURE 1, are pivotably supported for movement to a transverse position (FIG. 3) to receive and load or unload trailer bodies from the side of the flat car. The present invention affords the advantage that railroad flat cars can be loaded and unloaded without special loading dock provisions and from any suitable flat place adjacent the track. It is not necessary to drive the tractor and trailer over the tracks as in end loading procedures, and it becomes possible to load and unload railroad flat cars without uncoupling them. The arrangement has these and other advantages, as will appear.

Turning now to FIGS. 3 and 4 for details of such side loader apparatus and the way structure thereof, such way structure is similar for the loader section and the permanently fixed sections and comprises parallel channels 15, 16 supporting rollers 18. The loader section, including such parallel ways, which are rigidly interconnected by cross braces, is supported at the center for pivotal moveemnt by means described later. In the case of the permanently fixed sections, the channels are fastened down by any suitable means to the bed of the car.

Each way is formed by a U-shaped channel member 20 with an open upper side. Each channel member has spaced rollers 18 extending crosswise between the walls of the channels and are carried thereby to form a substantially even surface for receiving the rails carried on the under side of trailer bodies. Such rails, as shown in FIG. 5, may be in the form of I-beams 23 rigidly and permanently fastened to the under side 23 of the trailer bodies. The same means for interlocking the ways and rails described in the patent, is carried forward and used with the present apparatus, herein shown as a plurality of crossbolts 24 connected between the opposite walls of each of the channels 20, as shown in FIG. 5, and having a snug fit where passing through openings 26 in the rails 22 so as to hold the ways and rails against relative sidewise and vertical movement and thereby secure the trailer body on the flat car during long distance transport. This arrangement affords support for the weight of the trailer body and limits the transmission of dynamic forces to the rollers. Such forces are encountered in bouncing and jarring rides of the trailer bodies due to motion of the cargo carrier.

In carrying out the objectives of this invention, the middle way section M on the flat car 10 shown in FIGURE 1, comprises a loader section separate from the sections F, R permanently fixed on the bed of the flat car at either end. The loader section M is substantially the same length as a trailer body to be carried thereby. This side loader section M, hence, serves to support a trailer body during long distance transport as well as providing means to receive and shuttle trailer bodies to and from the permanently fixed way sections F, R.

The loader section M of parallel channel members 20 is supported under its center portion for pivotal or swivelling motion from a position lengthwise of the car, as shown in FIGURE 1, to a transverse loading position, as shown in FIG. 3. The parallel, longitudinally extending channels 20 which carry the spaced roller bearings 18 are tied together by cross bracing means, herein shown as bars or plates 28 extending transversely of the channel structure. Under the center of the section is a wide plate 30 under which the means for pivotal support is located. As shown, this pivotal support means comprises a floating member 32 which is carried in a recess 35 in the bed of the flat car 10 and may be elevated and lowered a limited distance to raise the loader section for clearance purposes while the latter is pivoted between loading and transport positions. The loader section M, including the parallel ways, is carried for pivotal motion on the floating member 32 by means of a pin 36 and bushing 38. The bushing 38 acts as a thrust bearing and supports the center plate 30. To provide better support for the plate while swivelling, means are provided separate from the floating member 32 and acting as anti-friction supports for the turntable, herein shown as a plurality of rollers 40–43, supported on brackets 40B–43B fastened to the under side of the center plate 30. The rollers ride on a raised annular ring 44 provided around the outer edge of the floating member 32.

To fix the loader section M against movement when in transport position and resting bodily on the upper bed of the flat car, means such as outwardly extending lugs or ears 46 (FIG. 3) are provided through which locking rods or bolts (not shown) may be passed and fastened securely to the flat car.

A hydraulic device, herein shown as a hydraulic piston 48 projecting from the under surface of the floating member 32 to be slidably received in a cylinder 49 is supplied with pressure fluid from a hand-operated pump 50. This device is provided to raise and lower the loader section M relative to the bed of the flat car so that, when raised clear above the flat car, the section may be freely turned from the transport position lengthwise of the cars, as shown in FIGURES 1 and 2, to a loading position transversely of the car where the ends hang cantilever fashion beyond the sides of the car, as shown in FIG. 3. Fluid is fed from the pump 50 through a valve V which is a two-position valve, in one position serving as a check valve to admit fluid upon successive strokes of the pump to the cylinder 49 for increasing the volume of fluid therein to raise the floating member 32, and in the other position serving to return fluid at a restricted rate from the cylinder to the reservoir 52, to smoothly lower the floating member and loader section.

After the loader section M is raised by means of the hydraulic device, the section may be pivoted manually to the loading position. With a trailer body on the section, this will be the unloading position. It is contemplated that the section will be braced suitably to support loaded trailers. In sliding trailer bodies to and from the loader section when positioned transversely, additional bracing may be required to support the unbalanced load experienced during transfer. The present invention provides for this purpose a pair of extensible struts 56, 58 pivotally supported adjacent each end of the loader section M. The cross braces 28 between the ways are formed to provide a channel 60 (FIG. 5). The pivotal support is provided by a shaft 62 extending through the channel sides and the upper ends of the pair of struts 56, 58. Such struts fit in the channel 60 and tucked between the channel members 20 when in raised position without projection to interfere with the swivelling motion of the section. The struts 56, 58 each include telescoping portions which may be moved relatively by a rack and pinion 63 to adjust the length of the struts to the required height to suit any particular ground condition.

With the loader section M in loading position and the struts 56, 58 down and positioned in place, a trailer is backed to the end of the section so that the end of the trailer body is supported on the section. The trailer body wheels are then removed with the tractor still supporting the forward end of the trailer body and then the tractor is backed up to back the trailer body onto the loader section. After the trailer body is driven as far as possible onto the loader section, the tractor is unhitched and driven away so that the trailer body may be moved by hand or by a winch provided on the tractor to a position centered on the loader section M. The latter then may be swivelled manually to a transport position lengthwise of the railway flat car. If, in such motion, the under side of the way structure brushes or abuts against the bed of the flat car because the channels have drooped due to the weight of the trailer body, the hydraulic device may be operated to raise the loader section slightly so as to clear the flat car. After the loader section is over the flat car, by shifting the valve V to its opposite position, the loader section is lowered onto the surface of the flat car.

With the trailer body interlocked to the ways of the section by means such as the bolts 24 of FIG. 5, and the loader section of the apparatus anchored rigidly to the surface of the flat car by interlocking means extending through the tabs 46, the loader section M may be used for transporting the trailer body for long distance transport.

It will be seen that in the arrangement of FIGURE 1 the side loader or transfer apparatus is used to transfer a trailer body from the tractor onto the transversely arranged loader section M. The section is then swivelled to a position lengthwise of the railroad flat car and then the trailer body shuttled to the fixed way section F or R at either end of the car as shown in FIGURE 1. After trailer bodies have been transferred in this manner to both end sections of the flat car, the third trailer body received on the middle or loader section M may be left thereon and permanently secured thereto for long distance transport.

In the embodiment of the invention as shown in FIG. 2, both trailer bodies 64, 66 are supported by flat car 67 carried side transfer sections 68, 70; such sections also serve the function of supporting the bodies for long distance transport. It will be seen that with such an arrangement there is no shuttling of the trailer bodies from the side loader sections. It is also contemplated that in this arrangement the same supporting structure and hydraulic means will be provided under the center of both sections, as shown in FIG. 4, and that the operation thereof will be the same as described hereinabove.

I claim as my invention:

In a railroad flat car structure for receiving a trailer body for railway transport: a turntable for loading said trailer body onto said flat car from the side of said car, said side loading turntable comprising a pair of parallel way members arranged in a common horizontal plane to slidably receive the trailer body and adapted to rest on said flat car with said way members extending longitudinally thereof in transport position, and means rigidly interconnecting said parallel way members; a manually operable hydraulic power means comprising a cylinder and piston assembly mounted on said flat car under said turntable, said power means being effective to raise said turntable clear above said flat car and to lower said turntable so that the latter rests bodily on said flat car; a separately acting turntable supporting anti-friction means carrying said turntable on said assembly and effective when said turntable is raised by said power means to be clear above said flat car to support said turntable for swivelling between the transport position and a transverse loading position wherein one end of said turntable projects from said flat car; and extensible means pivotally fixed to said turntable adjacent said one end thereof and movable from a horizontal transport position tucked under said turntable between said way members and an adjustable, vertical load sustaining position under said one end of said turntable for carrying the latter during trailer body loading operations.

References Cited by the Examiner

UNITED STATES PATENTS

| | | | |
|---|---|---|---|
| 1,461,574 | 7/1923 | Caplan | 296—23 |
| 1,541,457 | 6/1925 | Winn | 105—368 |
| 1,966,165 | 7/1934 | Clyde | 214—16.18 |
| 2,246,543 | 6/1941 | Smith | 105—368 |
| 2,782,733 | 2/1957 | Ewing | 105—368 |
| 2,821,936 | 2/1958 | Weissman | 104—45 |
| 2,835,209 | 5/1958 | Kavanaugh | 105—368 |
| 2,933,053 | 4/1960 | Mellam | 105—368 |
| 2,980,465 | 4/1961 | Letzler | 296—23 |
| 3,004,772 | 10/1961 | Bohlen et al. | 280—415 |

ARTHUR L. LA POINT, *Primary Examiner.*

JAMES S. SHANK, LEO QUACKENBUSH, *Examiners.*